United States Patent [19]

Klein et al.

[11] Patent Number: 4,856,041
[45] Date of Patent: Aug. 8, 1989

[54] X-RAY DETECTOR SYSTEM

[75] Inventors: Sigismund Klein, Nuremberg; Reiner Schulz, Erlangen, both of Fed. Rep. of Germany

[73] Assignee: Siemens Aktiengesellschaft, Berlin and Muncih, Fed. Rep. of Germany

[21] Appl. No.: 66,213

[22] Filed: Jun. 25, 1987

[30] Foreign Application Priority Data

Aug. 11, 1986 [DE] Fed. Rep. of Germany ...... 8621546

[51] Int. Cl.$^4$ .............................................. G21K 1/02
[52] U.S. Cl. ................................ 378/147; 378/19; 378/145; 250/363.10; 250/505.1
[58] Field of Search ................. 378/19, 145, 147, 149, 378/15 A; 250/363 S H, 505.1, 363.1

[56] References Cited

U.S. PATENT DOCUMENTS

| 3,227,880 | 1/1966 | Wideroe | 250/505.1 |
| 4,187,427 | 2/1980 | Cusano | 378/19 |
| 4,286,156 | 8/1981 | Wagner | 378/19 |
| 4,403,150 | 9/1983 | Kurihara et al. | 378/154 |
| 4,638,499 | 1/1987 | Eberhard et al. | 378/149 |

FOREIGN PATENT DOCUMENTS

| 7928023 | 9/1979 | Fed. Rep. of Germany . |
| 2814242 | 10/1979 | Fed. Rep. of Germany . |
| 3526860 | 1/1987 | Fed. Rep. of Germany ...... 378/147 |
| 0536449 | 5/1941 | United Kingdom . |
| 2013877 | 8/1979 | United Kingdom . |

OTHER PUBLICATIONS

"A Hard X-Ray Imaging Collimator", by Van Beek Space Science Instrumentation, vol. 2, pp. 197–204, 1976.

Primary Examiner—Craig E. Church
Assistant Examiner—John C. Freeman
Attorney, Agent, or Firm—Hill, Van Santen, Steadman & Simpson

[57] ABSTRACT

An x-ray detector system has a detector element disposed at the end of a channel formed by spaced collimator plates. The thickness of each collimator plate projected onto the detector element increases along the length of the collimator plates in the direction of radiation propagation through the channel. The projection (and thus the thickness) has a greatest value at a detector-proximate end of the plate. The edge regions of the detector element are thus shielded from x-radiation by the extended width collimator plates. The length of the absorption paths in the detector element thus are substantially the same, even given a detector element which is slightly obliquely disposed. Thus the shape of the portion of the detector surface effective for detecting radiation is substantially independent of slight changes in the focus position.

5 Claims, 1 Drawing Sheet

X-RAY DETECTOR SYSTEM

BACKGROUND OF THE INVENTION

1. Field of the Invention

The present invention is directed to an x-ray detector system having a plurality of collimator plates defining a plurality of collimator shafts, and a plurality of detector elements respectively disposed at the end of each of said shafts.

2. Description of the Prior Art

X-ray detector systems having collimator shafts formed by a plurality of space collimator plates, with a radiation detector element allocated to each collimator shaft at an end thereof is known in the art, and is used in radiation diagnostics systems wherein x-radiation generated by a radiation source is attenuated by an examination subject and the intensity distribution of the attenuated radiation is documented. An x-ray detector system as may be used, for example, in computer tomography and computer radiography may have several hundred up to a few thousand detector elements, linearly or circularly arranged and aligned with respect to the x-ray source. The collimator, in the form of collimator plates consisting of highly absorbent material, maintains the scatter radiation generated in the measuring field away from the detector elements.

An x-ray detector system of this type is described, for example, in German Utility Model Registration No. 7,928,023. This system, however, has the disadvantage that if the position of the focus changes (for example, due to vibration or thermal factors) the collimator shadows formed by the rectangularly-shaped collimator plates will spread perpendicular to the direction of beam travel, due to the enlarged projection area of the collimator plates on the detector surface. This can result in a reduced exploitation of the effective detector area, and degrades the efficiency of the detector system. Moreover, measuring errors can occur if the detector elements are not arranged precisely at a right angle relative to a central ray of the incident radiation. Such measuring errors are caused because the marginal rays no longer have the same absorption paths in the detector element as those rays disposed in the central portion of the x-ray beam.

SUMMARY OF THE INVENTION

Is is an object of the present invention to provide an x-ray detector system using collimator plates forming channels with a detector element disposed at the end of each channel, wherein exploitation of the effective detector area is as independent as possible from the position of the focus.

Another object of the present invention is to provide such an x-ray detector system wherein measuring errors are substantially eliminated even in the case of slightly obliquely attitudes and tilts of the detector element.

The above objects are achieved in accordance with the principles of the present invention in an x-ray detector system having collimator plates wherein the thickness of each collimator plate, projected onto the detector element, changes over the length of the plate in the radiation-propagation direction, and the plate and projection exhibit a largest value at the detector-proximate end of the plate. The detector width is selected such that a portion of the detector is behind the thick detector-proximate end of the collimator plate respectively facing the detector, so that a portion of the detector surface is in the radiation shadow formed by the plate. In the x-ray detector system disclosed herein, the marginal regions of each detector element are shielded from the radiation, so that substantially no change in the absorption paths in the detector element occurs even if the detector element is slightly obliquely oriented.

DESCRIPTION OF THE PREFERRED EMBODIMENTS

Figures 1, 2:
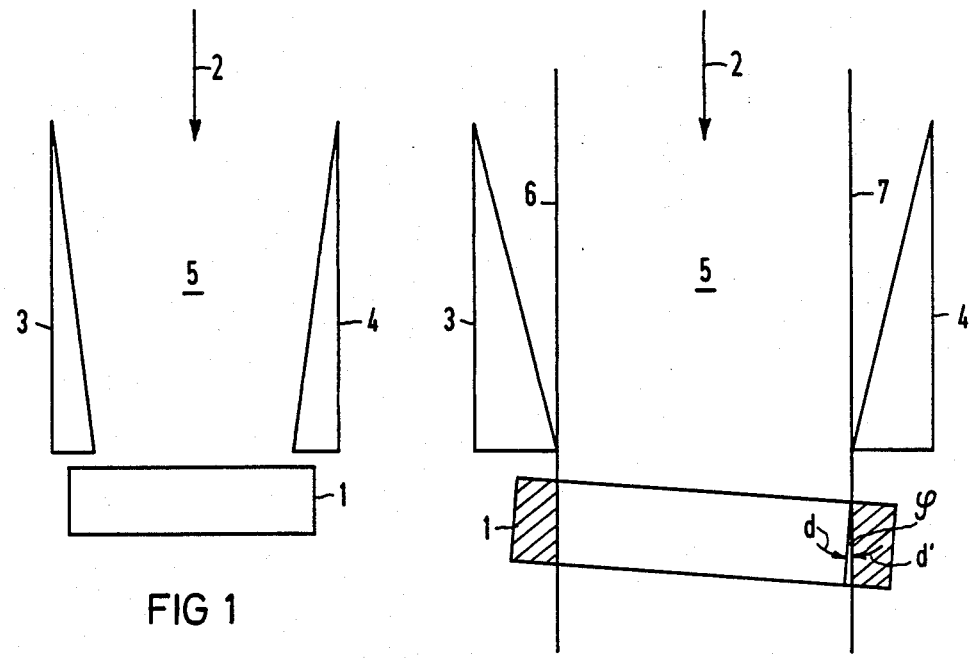
FIG. 1 is a side view of the principle elements of a detector system constructed in accordance with the principles of the present invention.
FIG. 2 is a side view of the detector system shown in FIG. 1, with the detector element slightly obliquely oriented.

The detector system shown in FIG. 1 includes a detector element on which x-radiation from an x-ray source (not shown) is incident, the radiation being propagated in the direction of the arrow 2. In order to maintain scatter radiation away from the detector element 1, a shaft is formed by two collimator plates 3 and 4, consisting of radiation-absorbing material. The plates are disposed in front of the detector element 1 as seen in the propagation direction. The shaft formed by the collimator plates 3 and 4 is referenced at 5. The collimator plates 3 and 4 in the embodiment of FIG. 1 have a wedge-shaped cross-section increasing in thickness in the direction of radiation propagation toward the detector element 1. The thickness of a collimator plate projected onto the surface of the detector element 1 thus changes along the length of the collimator plate in the radiation propagation direction, and has a largest value at the detector-proximate end of the plate. The width of the detector element 1 is selected such that a portion of the detector element 1 extends behind the detector-proximate end of each of the collimator plates 3 and 4, so that the edges of the detector element 1 are shielded by the collimator plates 3 and 4.

The detector element 1 is shown slightly obliquely disposed with respect to a central ray of the incoming radiation in FIG. 2, in contrast to the position of the detector element in FIG. 1, wherein the detector element is exactly perpendicularly disposed relative to a central ray. As shown in FIG. 2, even when the detector element 1 is obliquely oriented, the absorption paths for two marginal rays 6 and 7 are substantially the same as in the precisely aligned orientation of FIG. 1. The change in the length of the absorption paths from a value d for the orientation of FIG. 1 to a value d' in FIG. 2 is shown for a tilt angle phi. The angle phi will, in practice, be extremely small. The difference Δ of the absorption paths under these different orientations is calculable as follows:

$$\Delta = d' - d = d\left(\frac{1}{\cos phi} - 1\right) \simeq 0$$

For the small angles phi which are expected in practice, the difference is substantially zero. The edges of the detector element 1, at which significantly shortened absorption lengths can occur given irradiation and given tilting, are blanked by the collimator plates 3 and 4.

Figures 3, 4:
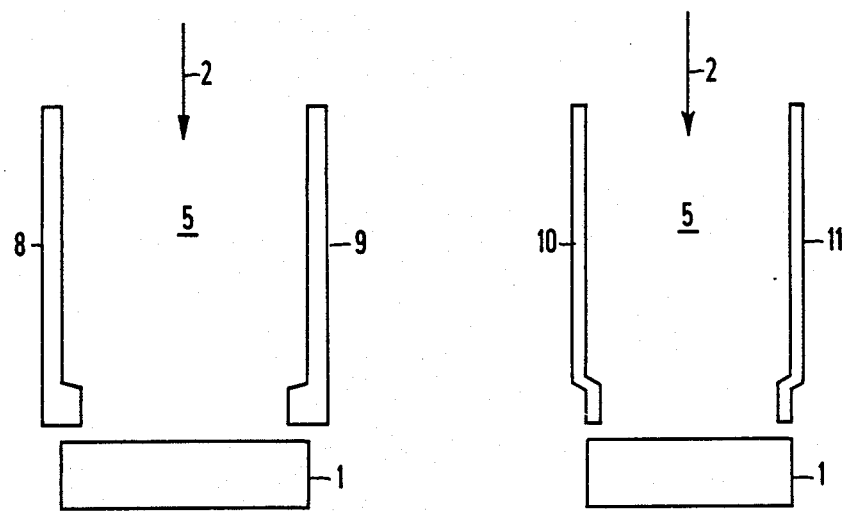
FIG. 3 is a side view of a further embodiment of the principle elements of a detector system constructed in accordance with the principles of the present invention.
FIG. 4 is a side view of another embodiment of a detector system constructed in accordance with the principles of the present invention.

An embodiment of the subject matter which is simple to manufacture is shown in FIG. 3. In this embodiment the two collimator plates 8 and 9 have a step increase in thickness at the detector-proximate ends. The plates 8 and 9 can be manufactured simply by etching away the upper portions of the collimator plates 8 and 9, leaving the step.

Another embodiment which is relatively simple to manufacture is shown in FIG. 4. In this embodiment the collimator plates 10 and 11 have an angled step at the detector-proximate ends thereof.

Although modifications and changes may be suggested by those skilled in the art it is the intention of the inventors to embody within the patent warranted hereon all changes and modifications as reasonably and properly come within the scope of their contribution to the art.

We claim as our invention:

1. An x-ray detector system for use with a source of x-radiation, said detector system comprising:

two spaced collimator plates defining a collimator shaft having a width therebetween in which said x-radiation propagates from a distal end toward a proximate end of said shaft;

a detector element disposed adjacent said proximate end of said shaft with respect to said collimator plates, said detector element having two spaced edges respectively disposed behind said collimator plates such that at least a portion of a surface of said detector element facing said collimator plates is shielded from radiation by said plates with a remainder of said detector element exposed to radiation; and each of said plates having a thickness projection on said surface of said detector element at said edges which varies along a length of each plate in the direction of propagation of said radiation from a smallest projection at said distal end to a largest projection at said proximate end so that said shaft has a largest width at said distal end and a smallest width at said proximate end.

2. An x-ray detector system as claimed in claim 1, wherein said thickness of said collimator plates varies continuously over said length.

3. An x-ray detector system as claimed in claim 1, wherein said thickness of said collimator plates varies discontinuously over said length.

4. An x-ray detector system as claimed in claim 1, wherein said collimator plates are wedge-shaped.

5. An x-ray detector system as claimed in claim 1, wherein said collimator plates have a stepped thickness.

* * * * *